United States Patent
Gaskins

(10) Patent No.: US 7,543,094 B2
(45) Date of Patent: Jun. 2, 2009

(54) TARGET READINESS PROTOCOL FOR CONTIGUOUS WRITE

(75) Inventor: Darius D. Gaskins, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 126 days.

(21) Appl. No.: 11/358,464

(22) Filed: Feb. 21, 2006

(65) Prior Publication Data

US 2007/0011376 A1 Jan. 11, 2007

Related U.S. Application Data

(60) Provisional application No. 60/697,063, filed on Jul. 5, 2005.

(51) Int. Cl.
*G06F 13/00* (2006.01)

(52) U.S. Cl. .................. 710/107; 710/305; 710/306; 713/600

(58) Field of Classification Search ......... 710/305–306, 710/240–244, 100; 713/600
See application file for complete search history.

(56) References Cited

U.S. PATENT DOCUMENTS

| 5,426,739 | A | * | 6/1995 | Lin et al. ................... 710/305 |
| 6,311,245 | B1 | | 10/2001 | Klein |
| 6,601,121 | B2 | | 7/2003 | Singh et al. |
| 6,609,171 | B1 | | 8/2003 | Singh et al. |
| 6,804,735 | B2 | | 10/2004 | Singh et al. |
| 6,807,592 | B2 | | 10/2004 | Singh et al. |
| 6,907,487 | B2 | | 6/2005 | Singh et al. |
| 2002/0147875 | A1 | * | 10/2002 | Singh et al. ................. 710/305 |

* cited by examiner

*Primary Examiner*—Clifford H Knoll
*Assistant Examiner*—Kim T Huynh
(74) *Attorney, Agent, or Firm*—Gary R. Stanford; Richard K. Huffman; James W. Huffman

(57) ABSTRACT

A method of performing contiguous write transactions on a processor bus according to an embodiment of the present invention includes detecting, by a bus agent, a request for a write cycle, asserting, by the bus agent, a target ready signal for one clock cycle in response to the write cycle during a first clock cycle of a data transfer phase of a prior write cycle or during a second clock cycle of a data transfer phase of a prior read cycle, asserting, by the bus agent, response signals in a next clock cycle following the clock cycle in which the target ready signal is asserted, asserting, by a processor, a data busy signal for the write cycle in the next clock cycle following the clock cycle in which the response signals are asserted, and asserting, by the processor, data for the write cycle when the data busy signal is asserted.

18 Claims, 4 Drawing Sheets

TARGET READINESS PROTOCOL FOR CONTIGUOUS WRITES

US 7,543,094 B2

TARGET READINESS PROTOCOL FOR CONTIGUOUS WRITE

CROSS-REFERENCE TO RELATED APPLICATIONS

This application claims the benefit of U.S. Provisional Application Ser. No. 60/697063, filed on Jul. 5, 2005, which is herein incorporated by reference for all intents and purposes.

BACKGROUND OF THE INVENTION

1. Field of the Invention

The present invention relates to processor data buses, and more particularly to a target readiness protocol apparatus and method that enable a microprocessor or like device to perform contiguous writes to memory.

2. Description of the Related Art

The bus interface of most microprocessors is substantially similar with minor variation. Memory addresses for transactions are provided over a bidirectional address bus referred to herein as ADDR. A bidirectional address strobe signal, referred to herein as ADS, indicates validity of the addresses on the ADDR bus. Data is transferred over a bidirectional data bus referred to herein as DATA. In some present day microprocessor architectures, eight bytes are transferred at a time, which quantity (8 bytes) is known as a "beat." In a present day quad-pumped data bus, such as is provided in the well-known PENTIUM® 4 microprocessor, four beats are transferred during each cycle of a bus clock signal, referred to herein as BCLK, and up to eight beats (64 bytes) can be transferred during a single transaction to accommodate transfer of an entire 64-byte cache line to or from memory. A bidirectional data bus busy signal, referred to herein as DBSY, is asserted by the entity that is providing the data (i.e., microprocessor or bus agent) during all but the final clock cycle that data is transferred over the DATA bus. The providing entity asserts DBSY to indicate that it is taking ownership of the DATA bus. A data ready signal, referred to herein as DRDY, is asserted by either the microprocessor or bus agent during all clock cycles that data is transferred over the DATA bus. The device that is providing the data asserts DRDY. A target ready signal, referred to herein as TRDY, is asserted only by the target device (e.g., the chipset) from which a write transaction has been requested. Assertion of TRDY indicates that the target agent is ready to provide the data for the write transaction. In addition, a response bus, referred to herein as RS, is asserted by the target agent to indicate the type of transaction response (e.g., no data, normal data, implicit writeback) that is being completed over the DATA bus.

Some processors multiplex addresses and data over the same signal group and thus provide control signals to indicate whether data or addresses are present. Other microprocessors utilize different address or data bus widths or control signals alternatively named. It is important to note that substantially all processors provide signals for communication with bus agents to indicate that the data bus is ready, that it is busy, and to receive indication from the bus agents that the agent is ready to receive the data corresponding to a write transaction.

Because the data associated with combined writes (e.g., write combines, non-temporal stores) is typically large, it is disadvantageous to not fully utilize the bandwidth of a data bus, whether that bus is quad pumped or otherwise. Since data buses typically operate at clock speeds many times slower than that of microprocessor core clocks, it is crucial to execute combined writes to memory with optimum efficiency. The inefficient utilization of bus bandwidth in a present day microprocessor is a consequence of the rules for deasserting the TRDY signal, referred to herein as the Target Readiness Protocol (TRP) rules. More particularly, because TRDY cannot be deasserted until the cycle following the cycle where it is confirmed that DBSY is deasserted according to the TRP rules, combined writes in a quad-pumped data bus can only employ a percentage of the bus bandwidth. This "handshake" of DBSY and TRDY (or analogous signals) is a de facto industry standard and serves to limit the flow of data to memory. Because of the rules associated with TRDY, it is impossible to saturate a present day data bus with write data.

SUMMARY OF THE INVENTION

A method of performing contiguous write transactions between a processor and a bus agent on a processor bus according to an embodiment of the present invention includes detecting, by the bus agent, a request for a write cycle, asserting, by the bus agent, a target ready signal in response to the write cycle during a first clock cycle of a data transfer phase of a prior write cycle, where the target ready signal is a one-cycle pulse, asserting, by the bus agent, response signals in a next clock cycle following the clock cycle in which the target ready signal is asserted, asserting, by the processor, a data busy signal for the write cycle in the next clock cycle following the clock cycle in which the response signals are asserted, and asserting, by the processor, data for the write cycle when the data busy signal is asserted. The method also includes detecting, by the bus agent, a request for each of a plurality of contiguous write cycles, asserting, by the bus agent, the target ready signal in response to each contiguous write cycle during a first clock cycle of a data transfer phase of a prior contiguous write cycle, asserting, by the bus agent, response signals for each contiguous write cycle in a next clock cycle following the clock cycle in which the target ready signal is asserted, asserting, by the processor, the data busy signal for each contiguous write cycle in the next clock cycle following the clock cycle in which the response signals are asserted and asserting, by the processor, data for each contiguous write cycle when the data busy signal is asserted.

The method may include detecting at least one address strobe signal and latching an address indicating a location for storing the data. The method may include asserting the target ready signal and the data busy signal at the same time. The method may include construing, by the processor, deassertion of the data busy signal after being asserted for the write cycle. The method may include asserting response signals indicating a type of transaction response for the write cycle. The method may include asserting data on a data portion of the processor bus. The method may include asserting a data ready signal concurrently with the assertion of the data for the write cycle.

A processor according to an embodiment of the present invention includes a control bus interface, a data bus interface, and an address bus interface. The control bus interface asserts a request for a write cycle, detects assertion of a target ready signal for the write cycle, detects assertion of response signals one clock cycle after assertion of the target ready signal, and asserts a data busy signal one clock cycle after assertion of the response signals. The data bus interface provides data for the write when the data busy signal is asserted. The address bus interface provides an address when the request for the write cycle is asserted. The control bus interface includes a target ready interface which detects the target ready signal for the write cycle during a first clock cycle of a data transfer phase of a prior write cycle. The target ready signal is a one-cycle pulse.

The control bus interface may include an address strobe interface which provides the request for a write cycle. The control bus interface may include a data busy interface which construes deassertion of the data busy signal during the write cycle. The control bus interface may include a response interface which detects assertion of the response signals after assertion of the target ready signal. The control bus interface may include a data ready interface which asserts data ready signals indicating that the data for the write cycle is asserted.

A processor bus system according to an embodiment of the present invention includes a processor bus, a processor, and a bus agent. The processor bus includes an address portion, a data portion, and a control portion. The processor includes a data bus interface, a control bus interface, and an address interface. The control bus interface of the processor asserts an address strobe to initiate a write cycle on the processor bus, detects a target ready signal on the processor bus, detects assertion of response signals on the processor bus indicating the write cycle, and asserts a data busy signal on the processor bus one clock cycle after assertion of the response signals. The target ready signal is a one-cycle pulse. The address bus interface of the processor asserts an address corresponding to the write cycle on the processor bus while the address strobe is asserted. The data bus interface asserts data on the processor bus when the data busy signal is asserted.

The bus agent of the processor bus system includes a control bus interface, an address bus interface, and a data bus interface. The control bus interface of the bus agent detects the address strobe, asserts the target ready signal for the write cycle for one clock cycle in a first clock cycle of a data transfer phase of a prior write cycle, and asserts the response signals one clock cycle after said target ready signal is asserted. The address bus interface of the bus agent latches the address corresponding to the write cycle on the processor bus. The data bus interface of the bus agent receives the data for the write cycle.

The control bus interface of the bus agent may include an address strobe interface, a data busy interface, a target ready interface and/or a data ready interface. The data busy interface may construe deassertion of the data busy signal during contiguous write cycles. The control bus interface of the processor may include a data ready interface which asserts a data ready signal on the processor bus coincident with the data asserted on the processor bus for the write cycle.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventor of the present application has recognized that it is disadvantageous to not fully utilize the bandwidth of a processor bus of a microprocessor, whether that bus is quad pumped or otherwise. He has further noted that since processor buses typically operate at clock speeds many times slower than that of microprocessor core clocks, it is crucial to execute combined writes to memory with optimum efficiency. The inventor has recognized that inefficient utilization of bus bandwidth is a consequence of the TRP rules for deasserting TRDY, which make it difficult if not impossible to saturate the data portion of the bus with write data. He has therefore developed a mechanism for saturating the bandwidth of a present day quad-pumped microprocessor data bus during combined writes, which mechanism includes a target readiness protocol apparatus and method which enable a microprocessor or like device to perform contiguous writes to memory, as will be further described below with respect to FIGS. 1-4.

Figure 1:
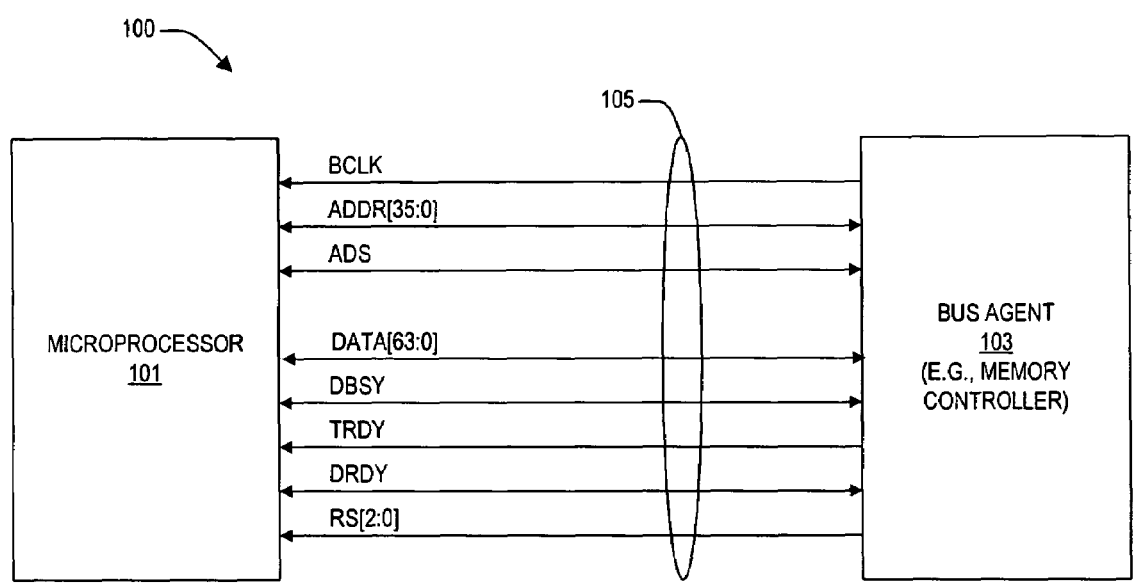
FIG. 1 is a simplified block diagram of a conventional microprocessor interface system.

FIG. 1 is a simplified block diagram of a conventional microprocessor interface system 100. The microprocessor interface system 100 includes a microprocessor 101 and a bus agent 103 interfaced with a processor bus 105. The bus agent 103 represents any number of different types of bus agents as known to those skilled in the art, such as a memory controller, a host/PCI (Peripheral Component Interconnect) bridge, etc. The processor bus 105 includes the signals for performing data transactions, including a bidirectional address bus ADDR, a bidirectional data bus DATA, and multiple control signals. In the illustrated embodiment, the ADDR bus has 36 signals shown as ADDR[35:0] and the DATA bus has 64 signals shown as DATA[63:0], although it is understood that the address and data buses may have any suitable number of signals depending upon the particular configuration and architecture. The control signals include a bus clock signal BCLK, a bidirectional address strobe signal ADS (indicating validity of the addresses on the ADDR bus), a bidirectional data bus busy signal DBSY (asserted by the entity that is providing data on the DATA bus), a data ready signal DRDY (asserted by either the device providing data during all clock cycles that data is transferred over the DATA bus), a target ready signal TRDY (asserted only by the target device from which a write transaction has been requested), and a response bus RS which provides the type of transaction response that is being completed over the DATA bus. In the illustrated embodiment, the RS bus has 3 signals shown as RS[2:0] to indicate up to 8 different transaction types.

Figure 2:
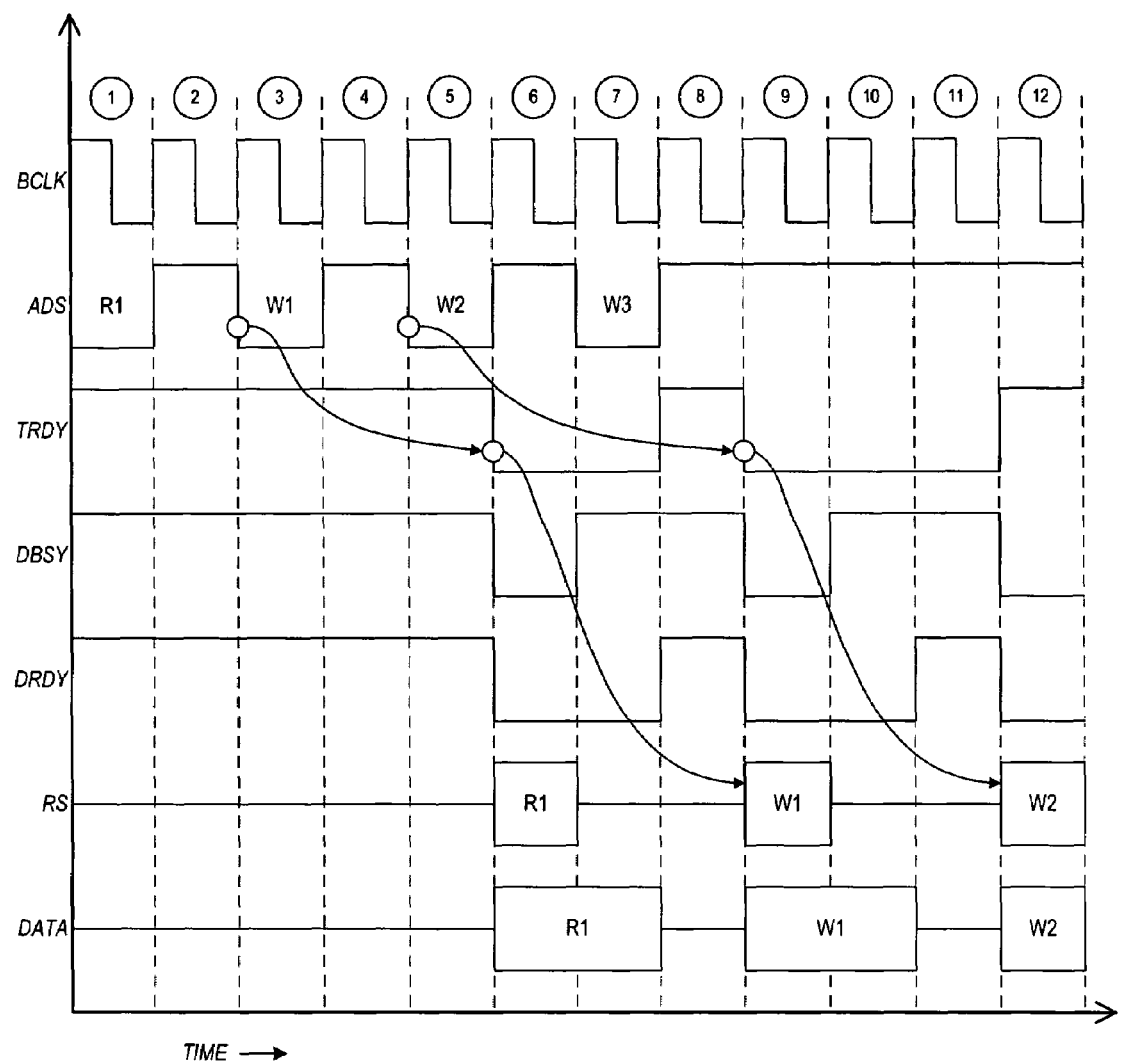
FIG. 2 is a timing diagram illustrating interaction of the signals described with reference to the conventional microprocessor interface system of FIG. 1 for performing a read transaction R1 followed by three write transactions W1, W2 and W3.

FIG. 2 is a timing diagram illustrating interaction of the signals described with reference to the conventional microprocessor interface system 100 for performing a read transaction R1 followed by three write transactions W1, W2 and W3. As shown, the BCLK, ADS, TRDY, DBSY and DRDY signals along with the RS and DATA buses are plotted versus time. For clarity, the ADDR bus is not shown and it is noted that the address (i.e., Request A and Request B packets) is provided over the ADDR bus for respective transactions R1 and W1-W3 during assertion of the corresponding address strobe ADS. The microprocessor 101 provides the address and the bus agent 103 latches the address upon detection of the ADS signals. Also for clarity, the control signals are shown asserted as a logic low level although one skilled in the art appreciates that assertion can as well be indicated by a logic high level. Operation of such transactions and corresponding signals as named herein in an x86-compatible microprocessor are described in numerous references, including the book "Pentium Pro and Pentium II System Architecture $2^{nd}$ Edition," by Tom Shanley and U.S. Patent Application Publication 2001/0037421A1, published Nov. 1, 2001 and entitled "Enhanced Highly Pipelined Bus Architecture," and which is herein incorporated by reference for all intents and purposes.

Cycles of the BCLK clock signal are shown across the top of the timing diagram along with cycle numbers and the timing of transitions of the states of the signals are described with respect to the corresponding cycle number. During cycles 1, 3, 5, and 7, ADS is asserted by the microprocessor 101 (along with request A/B packets provided over the ADDR bus) to request a read transaction R1 followed by the three write transactions W1-W3. For simplicity of illustration, delays are ignored and it is understood that actual signal transitions occur during the cycle immediately following the illustrated signal transition. For example, the falling edge of the ADS signal to initiate the W1 write transaction shown occurring at the rising edge of the BLCK signal between clock cycles 2 and 3 actually occurs during clock cycle 3 after a relatively short delay. Numerous write transactions such as W1-W3 are typically executed for writes to memory of write combined buffers and the like. During cycle 6, the bus agent 103 asserts DBSY, thus taking ownership of the processor bus 105. In addition, during cycles 6-7, the bus agent asserts DRDY and transfers the read data to the microprocessor 101 over the DATA bus. During cycle 6, the type of transaction is provided over the RS bus. During cycle 7, the bus agent 103 deasserts DBSY allowing for other bus agents or devices to take ownership of the processor bus 105. The bus agent 103 asserts the TRDY signal during cycle 6 to indicate its readiness to accept write data associated with the write cycle W1 indicated by the microprocessor 101. During cycle 8, the bus agent 103 deasserts the DRDY signal, thus indicating completion of the read transaction R1.

The TRP rules include a fundamental rule that TRDY cannot be deasserted until the cycle following the cycle where the bus agent 103 confirms that DBSY has been deasserted. In the case of a read transaction, since the bus agent 103 itself is the entity that deasserts DBSY, it can deassert TRDY during the following cycle. This case is illustrated for read transaction R1. But if the microprocessor 101 (or another bus agent) is controlling the state of DBSY (as in the case of a write transaction), then the bus agent 103 must hold TRDY asserted during the cycle that it samples DBSY deasserted, which is in the cycle following deassertion of DBSY by the microprocessor 101. Accordingly, during cycle 6, the bus agent 103 asserts TRDY to indicate its readiness for the write transaction W1 and, because the bus agent 103 is the agent that deasserts DBSY during cycle 7, it can deassert TRDY during cycle 8. But during cycles 9 and 10, the microprocessor 101 takes control of DBSY and TRDY to complete the write transaction W1. And since the microprocessor 101 deasserts DBSY in cycle 10, the bus agent 103 must wait until cycle 11 to sample DBSY deasserted, and hence cannot deassert TRDY until cycle 12. Because of this constraint, there is no way to fully utilize the bandwidth of the processor bus 105. Presently DBSY must be sampled deasserted prior to deasserting TRDY.

Since data buses typically operate at clock speeds many times slower than that of microprocessor core clocks, it is crucial to execute combined writes to memory with optimum efficiency. Because the data associated with combined writes (e.g., write combines, non-temporal stores) is typically large, it is disadvantageous to not fully utilize the bandwidth of a data bus, whether that bus is quad pumped or otherwise. The inefficient utilization of bus bandwidth in a present day microprocessor is a consequence of rules for deasserting TRDY according to the TRP rules as noted above, so that only a percentage of the bus bandwidth is utilized. This "handshake" of DBSY and TRDY (or analogous signals) is a de facto industry standard and serves to limit the flow of data to memory, so that it is impossible to saturate a present day data bus with write data.

A system and method according to the present invention provides an improved target readiness protocol that allows for abutted writes to memory. In summary, an embodiment according to the present invention decouples the relationship between DBSY and TRDY. In one embodiment, TRDY is a one-cycle pulse that indicates readiness for write data, and can be asserted as early as the first clock of a previous data transfer's data phase. Driving of DATA is still dependent on desertion of DBSY, but deassertion is either sampled or construed. For a read transaction, a bus agent providing the read data can "construe" deassertion of DBSY during the same cycle that it deasserts the signal. Thus, the bus agent does not wait until the following cycle to sample the signal that it deasserts. In addition, RS is provided one clock after the TRDY assertion to allow the next cycle of TRDY to be accepted, and is not provided before the last transfer of the previous data phase. Apparatus and method are provided in a microprocessor interface system implemented according to an embodiment of the present invention to determine and execute assertion/deassertion of TRDY and DBSY, thus allowing for writes to occur back-to-back over the processor bus.

Figure 3:
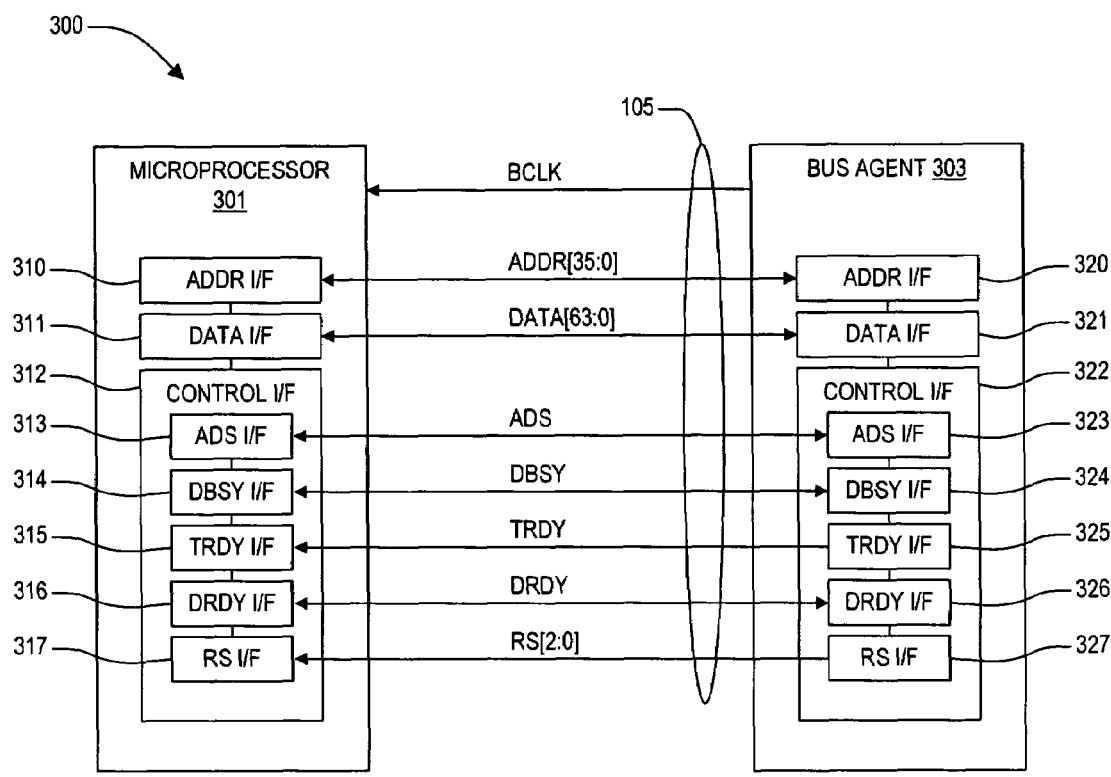
FIG. 3 is a simplified block diagram of an exemplary microprocessor interface system implemented according to an embodiment the present invention.

FIG. 3 is a simplified block diagram of an exemplary microprocessor interface system 300 implemented according to an embodiment the present invention. The processor bus 105 includes the same bus signals except shown in different order according to address, data and control portions. The bus signals operate in a substantially similar manner except for operation of TRDY relative to DBSY as further described below. The microprocessor 101 is replaced with a microprocessor 301 which includes an address bus interface 310, a data bus interface 311, and a control interface 312. The control interface 312 further includes an ADS interface 313 interfacing the ADS signals, a DBSY interface 314 interfacing the DBSY signal, a TRDY interface 315 interfacing the TRDY signal, a DRDY interface 316 interfacing the DRDY signal and an RS interface 317 interfacing the RS signals. The interfaces 310-312 are coupled together within the microprocessor 301 and the interfaces 313-317 are coupled together within the control interface 312 to collectively enable contiguous writes to be executed on the processor bus 105 in this quad-pumped bus architecture. It is noted that the microprocessor 101 includes similar interfaces but is implemented according to the conventional TRP rules and thus is unable to perform contiguous writes. The bus agent 103 is replaced with a bus agent 303 which includes an address bus interface 320, a data bus interface 321, and a control interface 322. The control interface 322 further includes an ADS interface 323 interfacing the ADS signals, a DBSY interface 324 interfacing the DBSY signal, a TRDY interface 325 interfacing the TRDY signal, a DRDY interface 326 interfacing the DRDY signal and an RS interface 327 interfacing the RS signals. The interfaces 320-322 are coupled together within the bus agent 303 and the interfaces 323-327 are coupled together within the control interface 322 to collectively enable contiguous writes to be executed on the processor bus 105 in this quad-pumped bus architecture. It is noted that the bus agent 103 may include similar interfaces but is implemented according to the conventional TRP rules and thus is unable to perform contiguous writes.

In the embodiment illustrated, for the microprocessor 301, the ADS interface 313 asserts the ADS signals to initiate a write cycle on the processor bus 105 and the ADDR interface 310 simultaneously asserts a corresponding address on the ADDR bus. The TRDY interface 315 monitors the TRDY signal in response to the write cycle request. The RS interface 327 asserts the signals on the RS bus during the clock cycle following the clock cycle in which the TRDY signal was asserted to indicate the write cycle. The DRDY interface 316 asserts the DRDY signal during the clock cycle following the clock cycle in which the RS bus signals are asserted. The DBSY interface 314 asserts the DBSY signal for one clock cycle during the clock cycle following the clock cycle in which the RS bus signals are asserted. The data bus interface 311 asserts data for the write cycle on the DATA bus simultaneously with the assertion of the DRDY signals. During contiguous write cycles, since the DBSY interface 314 of the microprocessor 301 is the entity asserting the DBSY signal, the control interface 312 of the microprocessor 301 construes deassertion of the DBSY signal. In this manner, the microprocessor 301 is able to assert data on the DATA bus in the next clock cycle following deassertion of the DBSY signal without having to sample the DBSY signal deasserted on the DATA bus.

In the embodiment illustrated, for the bus agent 301, the ADS interface 323 detects the request for the write cycle via the assertion of the ADS signals. The data busy interface 324 detects assertion of the DBSY signal during a data phase of a prior data transfer cycle. The TRDY interface 325 asserts the TRDY signal in response to the write cycle request for one clock cycle during a first clock cycle of a data phase of a prior write cycle or during a second clock cycle of a prior read cycle. The additional clock delay for the read cycle allows for switch-back on the processor bus 105 between read and write cycles. Since the TRDY signal may be asserted as early as the first clock of the previous data transfer's data phase, the TRDY may be asserted simultaneously with the DBSY signal for all of the contiguous write cycles except the first write cycle if the previous data transfer is a read cycle. If the previous data transfer is a read cycle, then the TRDY signal is asserted during the second clock of the prior read cycle's data phase. The RS interface 317 detects assertion of the signals on the RS bus indicating the data transfer phase of the write cycle. The DRDY interface 326 detects assertion of the DRDY signal indicating that data is valid on the DATA bus. The DATA bus interface 321 retrieves the data in response to the DRDY signal being asserted.

Figure 4:
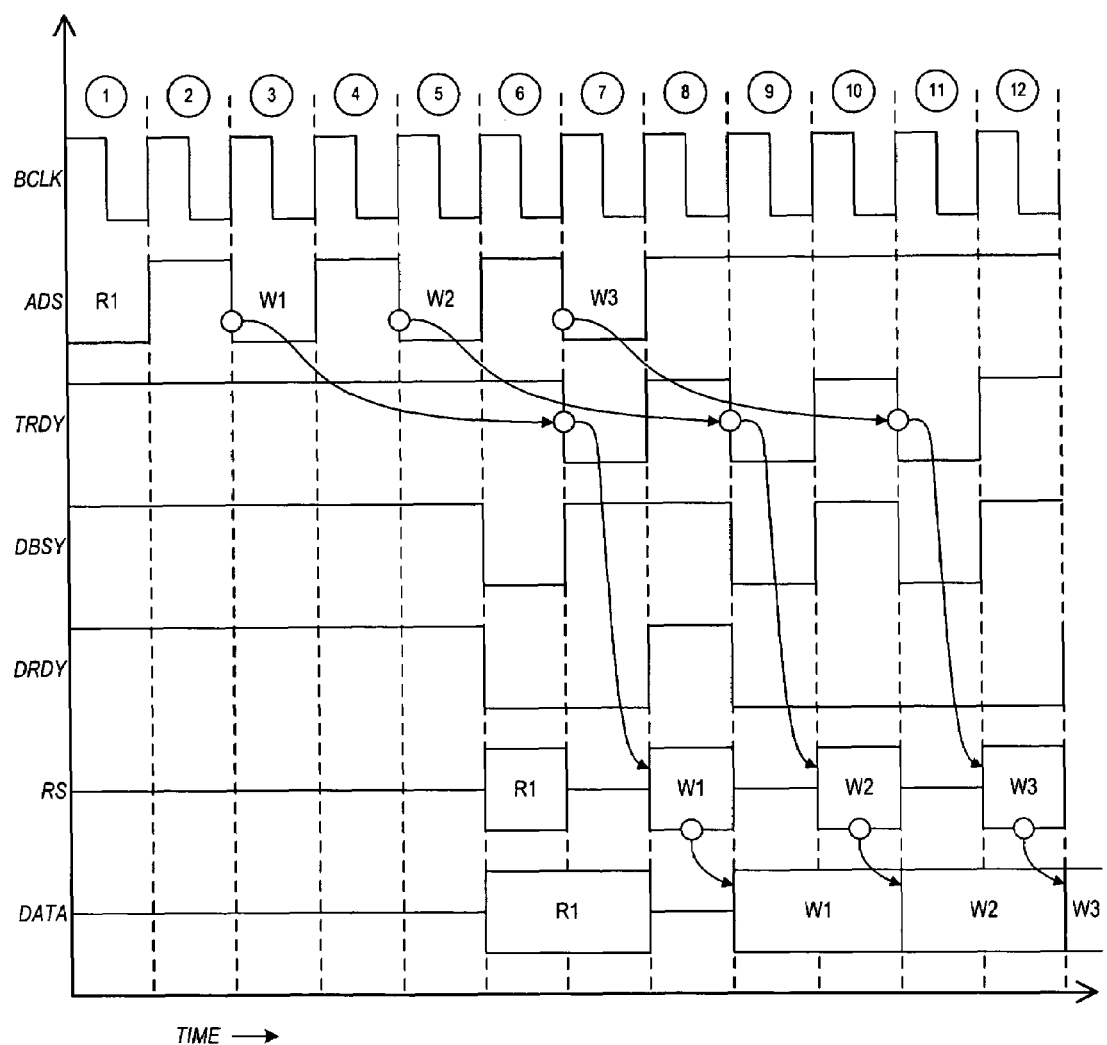
FIG. 4 is a timing diagram illustrating interaction of the signals described with reference to the microprocessor interface system of FIG. 3 for performing a read transaction R1 followed by three write transactions W1-W3 according to an exemplary embodiment of the present invention.

FIG. 4 is a timing diagram illustrating interaction of the signals described with reference to the microprocessor interface system 300 for performing a read transaction R1 followed by three write transactions W1-W3 according to an exemplary embodiment of the present invention. As shown, the BCLK, ADS, TRDY, DBSY and DRDY signals along with the RS and DATA buses are plotted versus time. Again, for clarity, the ADDR bus is not shown and it is noted that the address (i.e., Request A and Request B packets) for the respective transactions R1 and W1-W3 are provided during assertion of the address strobe ADS. The microprocessor 301 provides the address and the bus agent 303 latches the address upon detection of the ADS signals. Also for clarity, the control signals are shown asserted as a logic low level although one skilled in the art appreciates that assertion can as well be indicated by a logic high level.

Again, cycles of the bus clock BCLK are shown across the top of the timing diagram. Like the transactions illustrated with reference to the conventional microprocessor interface system 100 as shown in the timing diagram of FIG. 2, during cycles 1, 3, 5, and 7, the ADS signal is asserted (along with request A/B packets provided over the ADDR bus) by the ADS interface 313 to request a read transaction R1 followed by three write transactions W1-W3 in the same manner. During cycle 6, the DBSY interface 324 of the bus agent 103 asserts DBSY, thus taking ownership of the processor bus 105 for the read cycle R1. In addition during cycles 6-7, the DRDY interface 326 of the bus agent 303 asserts DRDY and the DATA bus interface 321 transfers the read data to the microprocessor 301 over the DATA bus. During cycle 6 as well, the type of transaction is provided over the RS bus by the RS interface 327.

As noted above, the TRDY signal is a one-cycle pulse that indicates readiness for write data, and can be asserted as early as the first clock of a previous data transfer's data phase or as early as the second clock of the data phase of a previous read cycle in the illustrated embodiment. To indicate readiness to accept write data associated with W1, the TRDY interface 325 of the bus agent 303 asserts TRDY during cycle 7 because, since it is the entity deasserting DBSY during cycle 7, deassertion of DBSY is construed during the same cycle. Because TRDY assertion is one cycle according to an embodiment of the present invention, TRDY is deasserted during cycle 8. Also during cycle 8, DRDY is deasserted, thus indicating completion of the read transaction R1.

In contrast to the conventional TRP rules, the protocol according to an embodiment of the present invention allows for deassertion of TRDY immediately in the next clock cycle after it has been asserted. Accordingly, a following write transaction is allowed to begin in the clock cycle following deassertion of TRDY and to support this new feature, the type of transaction is provided over the RS bus during the same cycle that TRDY is deasserted, that is, one cycle after TRDY assertion. Thus, the TRDY interface 325 of the bus agent 303 asserts TRDY to indicate readiness for W1 in cycle 7. And since TRDY assertions are one cycle, the response for W1 over the RS bus begins in cycle 8 and the data for W1 is transferred during cycles 9 and 10 between the DATA bus interfaces 311 and 321. Further, note that when DBSY is deasserted by the DBSY interface 314 in cycle 10, TRDY is deasserted as well. Since the DBSY interface 314 of the microprocessor 301 controls the DBSY signal in cycles 9 and 10, deassertion of the DBSY signal in cycle 10 is construed by the control interface 312. Thus, the DBSY interface 314 of the control interface 312 does not have to sample the DBSY signal deasserted, so that the data interface 311 may begin asserting data for W2 in the next clock cycle 11. The data for W2 begins transfer during cycles 11-12, with the response data for W2 provided during cycle 10, one cycle following assertion of TRDY for W2. Likewise, deassertion of DBSY and TRDY during cycle 12 allows for transfer of the W3 data during cycles 13 and 14 (not shown). Again, the microprocessor 301 construes deassertion of the DBSY signal in cycle 12 to enable early data transfer in next cycle 13.

According to the illustrated embodiment of the present invention, three abutted writes W1-W3 are executed during cycles 9-14, thus fully saturating the processor bus 105. Decoupling the relationship between TRDY and DBSY thus allows the processor bus 105 to be fully saturated with write data, which is a 33% improvement over the conventional microprocessor interface system 100 operating according to the conventional TRP rules.

Although the present invention has been described in considerable detail with reference to certain preferred versions thereof, other versions and variations are possible and contemplated. For example, the present invention also contemplates other mechanisms to allow for full speed write transactions over the bus. One such mechanism employs two TRDY signals. With two TRDY signals, target readiness could be indicated by either of the two TRDY signals being asserted. This would eliminate the delay incurred upon deassertion of a single TRDY signal. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method of performing contiguous write transactions between a processor and a bus agent on a processor bus, comprising:
   detecting, by the bus agent, a request for a write cycle;
   asserting, by the bus agent, a target ready signal in response to the write cycle during a first clock cycle of a data transfer phase of a prior write cycle, wherein the target ready signal is a one-cycle pulse;
   asserting, by the bus agent, response signals in a next clock cycle following the clock cycle in which the target ready signal is asserted;
   asserting, by the processor, a data busy signal for the write cycle in the next clock cycle following the clock cycle in which the response signals are asserted; and
   asserting, by the processor, data for the write cycle when the data busy signal is asserted
   detecting, by the bus agent, a request for each of a plurality of contiguous write cycles;
   asserting, by the bus agent, the target ready signal in response to each contiguous write cycle during a first clock cycle of a data transfer phase of a prior contiguous write cycle;
   asserting, by the bus agent, response signals for each contiguous write cycle in a next clock cycle following the clock cycle in which the target ready signal is asserted;
   asserting, by the processor, the data busy signal for each contiguous write cycle in the next clock cycle following the clock cycle in which the response signals are asserted; and
   asserting, by the processor, data for each contiguous write cycle when the data busy signal is asserted.

2. The method of claim 1, wherein said detecting a request for a write cycle comprises latching an address indicating a location for storing the data.

3. The method of claim 1, wherein said asserting the target ready signal for the write cycle during a first clock cycle of a data transfer phase of a prior write cycle comprises asserting the target ready signal and the data busy signal at the same time.

4. The method of claim 1, further comprising construing, by the processor, deassertion of the data busy signal after being asserted for the write cycle.

5. The method of claim 1, wherein said asserting response signals comprises asserting response signals indicating a type of transaction response for the write cycle.

6. The method of claim 1, wherein said asserting data for the write cycle comprises asserting data on a data portion of the processor bus.

7. The method of claim 6, further comprising asserting a data ready signal concurrently with said asserting the data for the write cycle.

8. A processor, comprising:
   a control bus interface, which asserts a request for a write cycle, which detects assertion of a target ready signal for said write cycle, which detects assertion of response signals one clock cycle after assertion of said target ready signal, and which asserts a data busy signal one clock cycle after assertion of said response signals;
   a data bus interface, coupled to said control bus interface, which provides data for said write cycle when said data busy signal is asserted; and
   an address bus interface which provides an address when said request for said write cycle is asserted;
   wherein said control bus interface comprises a target ready interface which detects said target ready signal for said write cycle during a first clock cycle of a data transfer phase of a prior write cycle; and
   wherein said target ready signal comprises a one-cycle pulse.

9. The processor of claim 8, wherein said control bus interface comprises an address strobe interface which provides said request for a write cycle.

10. The processor of claim 8, wherein said control bus interface comprises a data busy interface which construes deassertion of said data busy signal during said write cycle.

11. The processor of claim 8, wherein said control bus interface comprises a response interface which detects assertion of said response signals after assertion of said target ready signal.

12. The processor of claim 8, wherein said control bus interface further comprises a data ready interface which asserts data ready signals indicating that said data for said write cycle is asserted.

13. A processor bus system, comprising:
   a processor bus comprising an address portion, a data portion, and a control portion;
   a processor, coupled to said processor bus, comprising:
      a control bus interface which asserts an address strobe to initiate a write cycle on said processor bus, which detects a target ready signal on said processor bus, which detects assertion of response signals on said processor bus indicating said write cycle, and which asserts a data busy signal on said processor bus one clock cycle after assertion of said response signals;
      an address bus interface which asserts an address corresponding to said write cycle on said processor bus while said address strobe is asserted; and
      a data bus interface which asserts data on said processor bus when said data busy signal is asserted; and
   a bus agent, coupled to said processor bus, comprising:
      a control bus interface which detects said address strobe, which asserts said target ready signal for said write cycle for one clock cycle in a first clock cycle of a data transfer phase of a prior write cycle, and which asserts said response signals one clock cycle after said target ready signal is asserted, wherein said target ready signal comprises a one-cycle pulse;

an address bus interface which latches said address corresponding to said write cycle on said processor bus; and a data bus interface which receives said data for said write cycle.

14. The processor bus system of claim 13, wherein said control bus interface of said bus agent comprises an address strobe interface which detects said address strobe.

15. The processor bus system of claim 13, wherein said control bus interface of said processor comprises a data busy interface which construes deassertion of said data busy signal during contiguous write cycles.

16. The processor bus system of claim 13, wherein said control bus interface of said bus agent comprises a target ready interface which asserts said target ready signal.

17. The processor bus system of claim 13, wherein said control bus interface of said bus agent comprises a data ready interface which detects assertion of data ready signals indicating that said data for said write cycle is available on said processor bus.

18. The processor bus system of claim 13, wherein said control bus interface of said processor comprises a data ready interface which asserts a data ready signal on said processor bus coincident with said data asserted on said processor bus for said write cycle.

* * * * *